United States Patent

Viellet

[15] 3,648,341
[45] Mar. 14, 1972

[54] DEVICE FOR LOCKING A CUTTING PLATE ON THE BODY OF A TOOLHOLDER

[72] Inventor: Guy Viellet, Neuilly-sur-Seine, France

[73] Assignee: Societe Industrielle D'Electro-Metallurgie, Paris, France

[22] Filed: Feb. 24, 1970

[21] Appl. No.: 13,584

[30] Foreign Application Priority Data

Apr. 1, 1969 France....................................6909922

[52] U.S. Cl.............................................................29/96
[51] Int. Cl.........................................................B26d 1/00
[58] Field of Search........................29/96, 97, 98, 105, 105 A

[56] References Cited

UNITED STATES PATENTS

| 2,598,581 | 5/1952 | McKenna | 29/96 |
| 3,354,526 | 11/1967 | Erkfritz | 29/96 |
| 2,887,760 | 5/1959 | Armstrong | 29/96 |
| 3,059,316 | 10/1962 | Bader | 29/96 |
| 3,289,272 | 12/1966 | Stier | 29/96 |
| 2,877,535 | 3/1959 | Williams | 29/96 |

Primary Examiner—Harrison L. Hinson
Attorney—Marn & Jangarathis

[57] ABSTRACT

This invention relates to a device for locking a cutting plate with its support plate on the body of a toolholder comprising a screw which passes through the cutting plate and the support plate before being screwed into the body of the toolholder, wherein the body of the toolholder has a tapped housing receiving an externally threaded sleeve, said sleeve itself having a tapped housing intended for receiving the screw.

2 Claims, 1 Drawing Figure

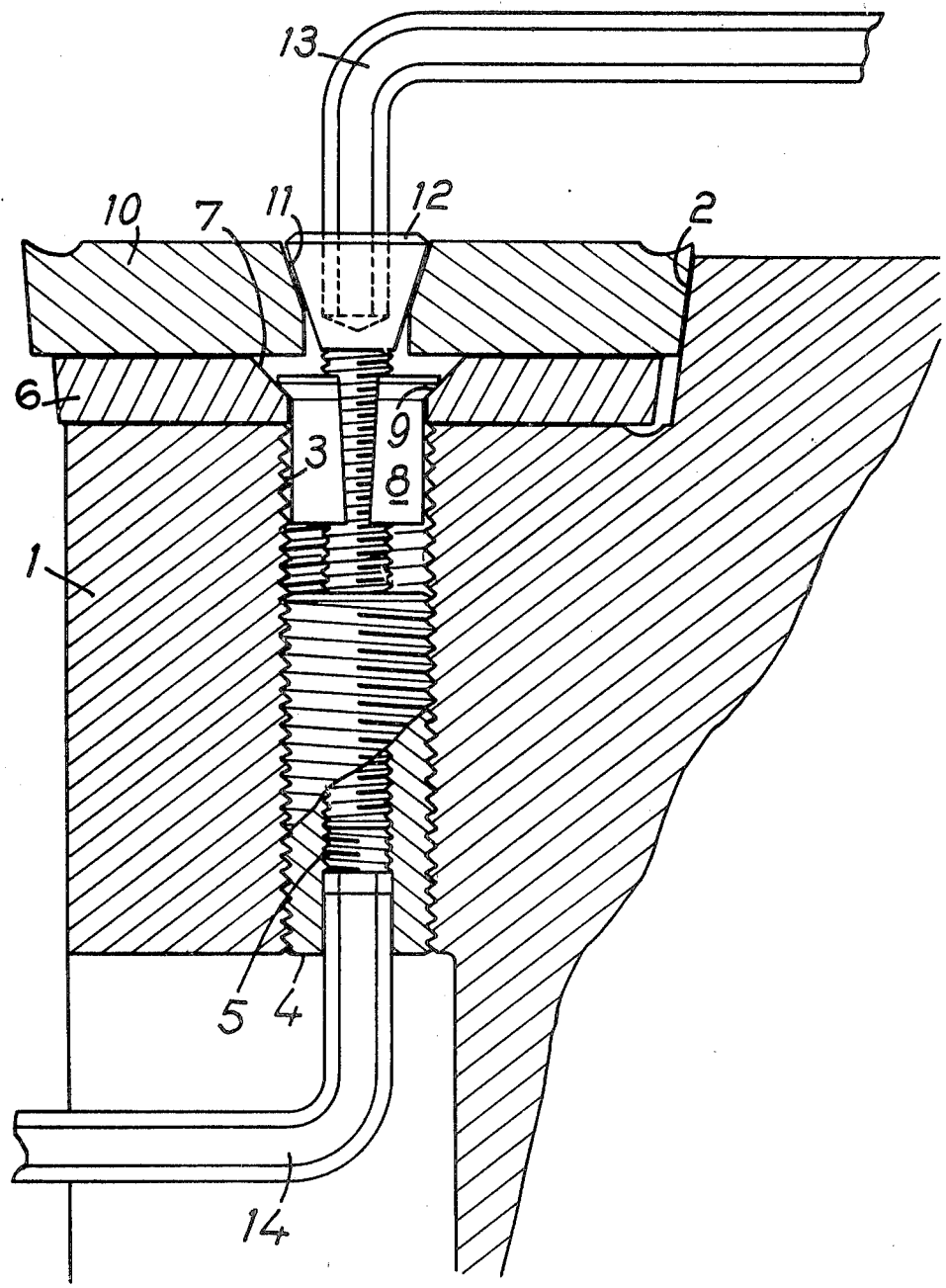

DEVICE FOR LOCKING A CUTTING PLATE ON THE BODY OF A TOOLHOLDER

The present invention relates to a device for locking a cutting plate on the body of a toolholder.

Devices are already known for locking a cutting plate on the body of a toolholder by means of a conical headed screw bearing on the cutting plate, the screw screwing into the body of the toolholder. Such devices have the disadvantage of being difficult to unlock when the cutting plate is to be replaced, due to the grip of the head of the screw on the plate consecutive to the heat produced by the cutting plate in operation. This results in a loss of time upon every dismantling.

The present invention has for its object to remedy this disadvantage by improving the device for locking a cutting plate on the toolholder. The plate is still locked by a central screw, but said latter is screwed into a sleeve itself screwed into the tapped hole of the toolholder.

The invention will be described in greater detail with reference to the accompanying drawings, in which:

the single FIGURE shows a partially cutaway longitudinal section through the device for locking a cutting plate on the body of a toolholder, according to the invention.

The body of the toolholder 1 has at one of its ends a disengagement 2, the shape of which corresponds to that of the plate 10. A tapped hole 3 is pierced in the toolholder, substantially in the center of the disengagement and over the whole thickness of the toolholder.

A cylindrical sleeve 4 pierced with a tapped hole 5 is screwed inside the hole 3.

A support plate 6 is placed on the upper part of the toolholder and in the center of disengagement 2. Said support plate is perforated with a central hole whose upper aperture comprises a chamfer 7. Said support plate is locked in its housing by a resilient split ring 8 whose upper sides 9 are widened out and abut on the chamfer 7. The lower cylindrical part of the resilient split ring is forcibly fitted on the threads of the tapped hole 3 of the toolholder.

The cutting plate 10 comprising a smooth central hole with a chamfer 11 bordering the upper aperture is placed on the support plate.

The whole of the device is held in locked position by a central conical headed screw 12 which passes through the cutting plate, the support plate and the split ring 8 in order to be screwed inside the sleeve 4.

The piercing of the cutting plate is slightly shifted with respect to the axis of the screw in order that, in locking position of the cutting plate, the conical head of the central screw exerts a pressure directed towards the mass of the body of the toolholder, that is to say towards the right in the example shown.

The lower end of the sleeve 4, opposite the cutting plate, has a fastening member that is sunk or raised or is otherwise arranged so as to permit its maneuver.

In the example shown, the central screw is locked by a socket screw hexagon wrench 13 which is inserted into the housing provided in the center of the conical head 12. When the tool has been in operation and the screw and plate are hot, unlocking is effected by lifting the sleeve 4 by means of a second socket screw hexagon wrench 14 which is inserted in the housing provided at the end of the sleeve; the screw may then be unscrewed very easily.

The details of the embodiment described may be modified without departing from the scope of the invention.

What I claim is:

1. A cutting tool comprised of a toolholder having a cutting plate receiving area, an access area opposite said receiving area and a threaded aperture extending through said toolholder between said receiving area and said access area;

a sleeve threaded into said aperture having a threaded aperture therein and provided with means to turn said sleeve from the access area side of said toolholder to cause said sleeve to advance therethrough towards said receiving area;

a cutting plate including a tapered aperture positioned on said cutting plate receiving area; and a conically headed screw positioned trough the tapered aperture of said cutting plate and threadably engaged with the threaded aperture of said sleeve to lock said cutting tool on said tool holder.

2. The cutting tool as defined in claim 1 including a support plate disposed between said cutting plate and said toolholder and including a tapered aperture for receiving a tapered split ring which engages the tapered aperture of said support plate and which engages forcibly the threaded aperture of said toolholder.

* * * * *